United States Patent
Wu et al.

(10) Patent No.: US 11,692,089 B2
(45) Date of Patent: Jul. 4, 2023

(54) COMPOSITIONS AND ADDITIVES FOR DEGRADING PLASTIC

(71) Applicant: Green Land Technology Co., Inc., Tracy, CA (US)

(72) Inventors: Min Yi Wu, Tracy, CA (US); Chaoxiong Wu, Guandong (CN)

(73) Assignee: Green Land Technology Co., Inc., Tracy, CA (US)

( * ) Notice: Subject to any disclaimer, the term of this patent is extended or adjusted under 35 U.S.C. 154(b) by 644 days.

(21) Appl. No.: 16/816,727

(22) Filed: Mar. 12, 2020

(65) Prior Publication Data

US 2021/0155789 A1 May 27, 2021

(51) Int. Cl.
| | |
|---|---|
| *C08L 27/06* | (2006.01) |
| *C08L 23/06* | (2006.01) |
| *C08L 23/08* | (2006.01) |
| *C08L 29/04* | (2006.01) |
| *C08L 67/02* | (2006.01) |
| *C08L 67/04* | (2006.01) |
| *C08L 69/00* | (2006.01) |

(52) U.S. Cl.
CPC ............... *C08L 27/06* (2013.01); *C08L 23/06* (2013.01); *C08L 23/0853* (2013.01); *C08L 29/04* (2013.01); *C08L 67/02* (2013.01); *C08L 67/04* (2013.01); *C08L 69/00* (2013.01)

(58) Field of Classification Search
CPC .... C08L 23/286; C08L 23/0853; C08L 67/02; C08L 67/04
See application file for complete search history.

(56) References Cited

U.S. PATENT DOCUMENTS

| | | | | |
|---|---|---|---|---|
| 2008/0318318 | A1* | 12/2008 | Shimizu | ............ B29B 7/90 366/76.2 |
| 2012/0289625 | A1* | 11/2012 | Matsuno | ............ C08K 5/29 524/133 |

OTHER PUBLICATIONS

Martins-Franchetti et al. (J Polym Environ, 2010, 18, 79-83) (Year: 2010).*
Klaric et al. (Journal of Applied Polymer Science, vol. 78, 166-172, 2000) (Year: 2000).*
Hadj-Hamou et al. (Polym. Bull. 2014, 71, 1483-1503) (Year: 2014).*
Hardt (Br. Polym. J. 1969, 1, 225-232) (Year: 1969).*

* cited by examiner

*Primary Examiner* — Liam J Heincer
(74) *Attorney, Agent, or Firm* — Anooj Patel; Kevin Schraven; Hankin Patent Law APC

(57) ABSTRACT

A chemical composition for use with polyvinyl chloride that may be used to increase the rate at which the polyvinyl chloride breaks down or disintegrates after being discarded as the surface gradually forms defects, holes, or cracks, including when in a landfill, wherein the chemical composition includes the chemicals PBAT, PCL, EVA, CPE, PLA, PGA, PHA, PHB, PE, PVA, PBS, PPC, and PET.

5 Claims, No Drawings

COMPOSITIONS AND ADDITIVES FOR DEGRADING PLASTIC

FIELD

The present disclosure relates generally to a chemical additive useful for inclusion with plastics. More specifically, the present disclosure relates to a chemical additive, which when added to a polyvinyl chloride, causes the polyvinyl chloride to degrade, break down, or disintegrate more quickly.

BACKGROUND

Polyvinyl chloride ("PVC") is a commonly used polyethylene plastic. PVC may be rigid or flexible. The rigid form of PVC is often used in construction for pipe and in profile applications such as doors and windows. It is also used in making bottles, non-food packaging, food-covering sheets, bank cards, membership cards, and a variety of other often used items that require durability. PVC can be made softer and more flexible by the addition of plasticizers, the most widely used being phthalates. In this form, it is also used in plumbing, electrical cable insulation, imitation leather, flooring, signage, phonograph records, plastic film, inflatable products, and many applications where rubber was previously used. PVC may be used with cotton or linen to make canvas.

PVC is widely used in part because it is light, cheap, and durable. One significant issue with PVC is that because it is so durable, it may survive well past its intended use life. This has caused a modern problem that PVC essentially sits in landfills for extremely long amounts of time. Because PVC is so widely used, this means that the landfills are becoming full of this long lived hard to break down material.

PVC is widely used in industrial production and daily life. It brings many conveniences to human life, but it also causes serious environmental problems. Because PVC cannot be naturally degraded and decomposed, discarded PVC products tend to exist for a long time, causing harm to the environment. If PVC is incinerated, a large amount of highly toxic dioxin exhaust gas will also be generated. The development of degradable PVC can reduce the environmental damage caused by waste PVC. The types of degradation include photodegradation, thermal degradation, and biodegradation. However, some PVC developments leading to these desired qualities result in in a sacrifice of the usability of PVC and safety. Hidden dangers, such as swimming rings made of PVC, may cause air leaks and cracks during use, which may threaten the user's life and safety. However, photodegradation, thermal degradation, and biodegradation may occur simultaneously. Therefore, it is important to develop a PVC plastic that is stable and safe in use and can be degraded and disintegrated after being discarded.

Thus, there exists a need for a PVC additive that allows the PVC to retain its main functional qualities for the life of its intended use, but breaks down in landfills more quickly than the natural process normally allows.

SUMMARY

To minimize the limitations in the cited references, and to minimize other limitations that will become apparent upon reading and understanding the present specification, the present specification discloses a chemical composition useful with PVC to degrade, break down, or disintegrate more the PVC quickly.

One embodiment may be a chemical composition comprising: PBAT; PCL; EVA; and CPE. A ratio of the PBAT:PCL:EVA:CPE may be about 10:5:2:2. The chemical composition may further comprise PLA; PGA; and PHA. A ratio of the PBAT:PCL:EVA:CPE:PLA:PGA:PHA may be about 10:5:2:2:0.4:0.4:0.2. The chemical composition may further comprise PHB; PE; PVA; PBS; PPC; and PET.

Another embodiment may be a chemical composition comprising: PVC; one or more core components, wherein the one or more core components may be selected from the group of components consisting of one or more of: PBAT; PCL; EVA; CPE; and combinations thereof; and one or more secondary components, wherein the one or more secondary components may be selected from the group of components consisting of one or more of: PLA; PGA; PHA; and combinations thereof. The PVC may comprise about 90% of the chemical composition, the core components may comprise about 9.5% of the chemical composition, and the secondary components may comprise about 0.5% of the chemical composition. The chemical composition may further comprise one or more tertiary components, wherein the tertiary components are selected from the group of components consisting of one or more of: PHB; PE; PVA; PBS; PPC; PET; and combinations thereof; wherein the tertiary components comprise about 0.1% of the chemical composition. The chemical composition may comprise about 85-95% PVC; about 5-14% of the one or more core components; about 2.5-7.5% of the one or more secondary components; and about 0.1-2% of the one or more tertiary components. In one embodiment, the PVC may be in the range of 50-99.9%; wherein the one or more core components may be: the PBAT, which is in the range of 0.1-10%; the PCL, which is in the range of 0.1-5%; the EVA, which is in the range of 0.01-2%; the CPE, which is in the range of 0.01-2%; wherein the one or more secondary components are: the PLA, which is in the range of 0.001-1%; the PGA, which is in the range of 0.001-1%; and the PHA, which is in the range of 0.001-1%.

Another embodiment of a chemical composition may comprise: about 89.9% PVC; about 5% PBAT; about 2.5% PCL; about 1% EVA; about 1% CPE; about 0.2% PLA; about 0.2% PGA; about 0.1% PHA; and about 0.1% of one or more components selected from the group of components consisting of one or more of: PHB; PE; PVA; PBS; PPC; PET; and combinations thereof.

It is an object of the present disclosure to overcome the limitations of the prior art.

Another object of the present disclosure is to provide a chemical composition that may be an additive to PVC to create a PVC based product that may degrade, decompose, breakdown, or disintegrate more quickly than PVC not having the additional chemical composition additive.

Another object of the present composition is to break down PVC that includes the chemical composition under landfill conditions.

Additional embodiments of the disclosure will be understood from the detailed description of the disclosure.

DETAILED DESCRIPTION OF THE DISCLOSURE

Before the present device, methods, and systems are disclosed and described, it is to be understood that the methods and systems are not limited to specific device and methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that may be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all embodiments of this application including, but not limited to, steps in disclosed methods. Thus, if there are a variety of additional steps that may be performed it is understood that each of these additional steps may be performed with any specific embodiment or combination of embodiments of the disclosed methods.

The present methods and systems may be understood more readily by reference to the following detailed description of preferred embodiments and the examples included therein.

In the following description, certain terminology is used to describe certain features of one or more embodiments. For purposes of the specification, unless otherwise specified, the term "substantially" refers to the complete or nearly complete extent or degree of an action, characteristic, property, state, structure, item, or result. For example, in one embodiment, an object that is "substantially" located within a housing would mean that the object is either completely within a housing or nearly completely within a housing. The exact allowable degree of deviation from absolute completeness may in some cases depend on the specific context. However, generally speaking, the nearness of completion will be so as to have the same overall result as if absolute and total completion were obtained. The use of "substantially" is also equally applicable when used in a negative connotation to refer to the complete or near complete lack of an action, characteristic, property, state, structure, item, or result.

As used herein, the terms "approximately" and "about" generally refer to a deviance of within 5% of the indicated number or range of numbers. In one embodiment, the term "approximately" and "about", may refer to a deviance of between 0.001-10% from the indicated number or range of numbers.

Various embodiments are now described with reference to the drawings. In the following description, for purposes of explanation, numerous specific details are set forth in order to provide a thorough understanding of one or more embodiments. It may be evident, however, that the various embodiments may be practiced without these specific details. In other instances, well-known structures and devices are shown in block diagram form to facilitate describing these embodiments.

Various embodiments presented in terms of systems may comprise a number of components, modules, and the like. It is to be understood and appreciated that the various systems may include additional components, modules, etc. and/or may not include all of the components, modules, etc. discussed herein. A combination of these approaches may also be used.

The compositions and additives of the present disclosure, when used with PVC, reduces the time required for PVC to break down under normal and landfill type conditions.

The chemical composition of the present disclosure utilizes various components that when combined create an effect that has beneficial effects, and are combined in novel combinations and amounts, such that the embodiments disclosed herein have never before been created.

"PVC" as used herein refers to polyvinyl chloride, a synthetic plastic polymer.

"PBAT" as used herein refers to polybutylene adipate terephthalate, a biodegradable random copolymer, specifically a copolyester of adipic acid, 1,4-butanediol and terephthalic acid.

"PCL" as used herein refers to polycaprolactone, a biodegradable polyester with a low melting point of around 60° C.

"EVA" as used herein refers to ethylene-vinyl acetate or polyethylene-vinyl acetate, an elastomeric polymer that produces materials which are "rubber-like" in softness and flexibility.

"CPE" as used herein refers to chlorinated polyethylene, a variation of polyethylene having a chlorine content from 34 to 44%. One important feature of CPE is that it may normally be used to increase impact resistance of PVC.

"PLA" as used herein refers to polylactic acid, a bioplastic often used in additive manufacturing processes.

"PGA" as used herein refers to polyglycolide, a biodegradable thermoplastic polymer.

"PHA" as used herein refers to polyhydroxyalkanoates, which are polyesters produced in nature by various microorganisms. PHA is a polymer belonging to the polyesters class that are of interest as bio-derived and biodegradable plastics.

"PHB" as used herein refers to polyhydroxybutyrate, a type of PHA.

"PE" as used herein refers to polyethylene, a common plastic.

"PVA" as used herein refers to polyvinyl alcohol, a water soluble-synthetic polymer.

"PBS" as used herein refers to polybutylene succinate, a biodegradable aliphatic polyester.

"PPC" as used herein refers to Polypropylene carbonate, a copolymer of carbon dioxide and propylene oxide, which is a thermoplastic material.

"PET" as used herein refers to polyethylene terephthalate, is a thermoplastic polymer resin of the polyester family.

One embodiment of a chemical composition may comprise PBAT, PCL, EVA, and CPE. This combination of PBAT, PCL, EVA, and CPE may be referred to herein as the "Core Components". In this embodiment, the ratio of PBAT:PCL:EVA:CPE may be about 10:5:2:2 by mass.

Another embodiment of a chemical composition may consist of the Core Components with the addition of one or more of PLA, PGA, and PHA, which may be referred to herein as the "Secondary Components". In one embodiment, PLA, PGA, and PHA may be added to the Core Components, and may have the relative chemical ratio of PBAT:PCL:EVA:CPE:PLA:PGA:PHA of about 10:5:2:2:0.4:0.4:0.2 by mass.

In alternative embodiments, effective amounts of one or more of PHB, PE, PVA, PBS, PPC, and PET may be added to the Core Components and Secondary Components. PHB, PE, PVA, PBS, PPC, and PET may be referred to herein as "Tertiary Components".

In one embodiment, the Core Components may be combined and formed into homogenous pellets. Preferably, Core Component pellets may be used as an additive for inclusion with PVC, such that the ratio of Core Components:PVC is about 1:9. Alternative ratios of Core Components:PVC may be used, with the understanding that a higher amount of Core Components may lead to the resulting PVC based product to break down or degrade more quickly.

In another embodiment, the Core and Secondary Components may be combined and formed into homogenous pellets. Preferably, Core and Secondary Component pellets may be used as an additive for inclusion with PVC, such that the ratio of Core and Secondary Components:PVC is about 1:9. Alternative ratios of Core and Secondary Components:PVC may be used, with the understanding that a higher amount of Core and Secondary Components may lead to the resulting PVC based product to break down or degrade more quickly.

In another embodiment, the Core, Secondary, and Tertiary Components may be combined and formed into homogenous pellets. Preferably, Core, Secondary, and Tertiary Component pellets may be used as an additive for inclusion with PVC, such that the ratio of Core, Secondary, and Tertiary Components:PVC is about 1:9. Alternative ratios of Core, Secondary, and Tertiary Components:PVC may be used, with the understanding that a higher amount of Core, Secondary, and Tertiary Components may lead to the resulting PVC based product to break down or degrade more quickly.

In some embodiments, a combination of the Core Components, Secondary Components, and/or Tertiary Components may be considered a "PVC Additive", which may be combined with PVC material to form a PVC material that degrades more quickly than PVC without the PVC Additive.

The PVC Additive may be prepared in pellet or powder form in order to combine with PVC at a later time. Alternatively, the components of the PVC Additive may be added directly to PVC during the manufacturing process.

One embodiment of a chemical composition may comprise about 89.9% PVC; about 5% PBAT; about 2.5% PCL; about 1% EVA; about 1% CPE; about 0.2% PLA; about 0.2% PGA; about 0.1% PHA; and about 0.1% of components selected from the group consisting of PHB; PE; PVA; PBS; PPC; and PET.

One embodiment of a chemical composition may comprise about 90% PVC; about 5% PBAT; about 2.5% PCL; about 1% EVA; about 1% CPE; about 0.2% PLA; about 0.2% PGA; and about 0.1% PHA.

One embodiment of a chemical composition may comprise about 85-95% PVC; about 5-14% Core Components; about 2.5-7.5% Secondary Components; and about 0.1-2% Tertiary Components.

Table 1 shows a preferred embodiment, as well as a range percentage of PVC, Core Components, and Secondary Components:

TABLE 1

| Material | Preferred Percentage | Range Percentage |
|---|---|---|
| PVC | 90% | 50-99.9% |
| PBAT | 5% | 0.1-10% |
| PCL | 2.5% | 0.1-5% |
| EVA | 1% | 0.01-2% |
| CPE | 1% | 0.01-2% |
| PLA | 0.2% | 0.001-1% |
| PGA | 0.2% | 0.001-1% |
| PHA | 0.1% | 0.001-1% |

Using the composition of the present disclosure may allow PVC to be manufactured that breaks down or disintegrates much more quickly than standard PVC.

The composition of the present disclosure may provide a high degree of stability of PVC products under normal light and heat conditions, yet may be biodegraded without affecting usability of the material, such that the material is safe and stable for use as intended. After discarding the material, it may disintegrate from large materials to small pieces in a relatively short time, reducing volume of waste, increasing the rate of degradation, and facilitating subsequent waste treatment.

The degradable and disintegrable PVC plastic in the present invention may be used for preparing PVC plastic products that may be stable during use, not substantially affected by light, heat, and water conditions, as well as may have chemical substitutions. Under certain conditions, the PVC plastic may form defects, holes, and brittle cracks, then be pulverized, degraded, disintegrated, and converted to the injected volume to increase degradation rate. This material may be further processed and may be environmentally friendly.

Unless otherwise stated, all measurements, values, ratings, positions, magnitudes, sizes, locations, and other specifications that are set forth in this specification, including in the claims that follow, are approximate, not exact. They are intended to have a reasonable range that is consistent with the functions to which they relate and with what is customary in the art to which they pertain.

The foregoing description of the preferred embodiment has been presented for the purposes of illustration and description. While multiple embodiments are disclosed, still other embodiments will become apparent to those skilled in the art from the above detailed description. These embodiments are capable of modifications in various obvious aspects, all without departing from the spirit and scope of protection. Accordingly, the detailed description is to be regarded as illustrative in nature and not restrictive. Also, although not explicitly recited, one or more embodiments may be practiced in combination or conjunction with one another. Furthermore, the reference or non-reference to a particular embodiment shall not be interpreted to limit the scope of protection. It is intended that the scope of protection not be limited by this detailed description, but by the claims and the equivalents to the claims that are appended hereto.

Except as stated immediately above, nothing that has been stated or illustrated is intended or should be interpreted to cause a dedication of any component, step, feature, object, benefit, advantage or equivalent, to the public, regardless of whether it is or is not recited in the claims.

What is claimed is:

1. A chemical composition comprising:
   polybutylene adipate terephthalate;
   polycaprolactone;
   ethylene-vinyl acetate; and
   chlorinated polyethylene;
   wherein a ratio of said polybutylene adipate terephthalate:polycaprolactone:ethylene-vinyl acetate:chlorinated polyethylene
   is about 10:5:2:2.

2. A chemical composition comprising:
   polybutylene adipate terephthalate;
   polycaprolactone;
   ethylene-vinyl acetate; and
   chlorinated polyethylene;
   polylactic acid;
   polyglycolide; and
   polyhydroxyalkanoates.

3. The chemical composition of claim 2, wherein a ratio of said polybutylene adipate terephthalate:polycaprolactone:ethylene-vinyl acetate:chlorinated polyethylene:polylactic acid:polyglycolide:polyhydroxyalkanoates is about 10:5:2:2:0.4:0.4:0.2.

4. The chemical composition of claim 2, further comprising:
   polyhydroxybutyrate;
   polyethylene;
   polyvinyl alcohol;
   polybutylene succinate;
   polypropylene carbonate; and
   polypropylene carbonate.

5. The chemical composition of claim 2, further comprising one or more chemicals selected from the group of chemicals consisting of one or more of: polyhydroxybutyrate:polyethylene:polyvinyl alcohol; polybutylene succinate:polypropylene carbonate:polypropylene carbonate PHB; PE; PVA; PBS; PPC; PET; and combinations thereof.

* * * * *